(12) United States Patent
Chen

(10) Patent No.: US 6,826,061 B2
(45) Date of Patent: Nov. 30, 2004

(54) OFF-LINE NON-STEP VOLTAGE REGULATION UNINTERRUPTIBLE POWER SUPPLY

(76) Inventor: Lien-Ching Chen, 4Fl., No. 147, Junghua Rd., Shulin City, Taipei (TW), 238

( * ) Notice: Subject to any disclaimer, the term of this patent is extended or adjusted under 35 U.S.C. 154(b) by 34 days.

(21) Appl. No.: 10/419,827

(22) Filed: Apr. 22, 2003

(65) Prior Publication Data

US 2004/0212355 A1 Oct. 28, 2004

(30) Foreign Application Priority Data

Mar. 4, 2003 (TW) .................................... 092203272 U

(51) Int. Cl.[7] .......................... H02M 5/45; H02M 5/458
(52) U.S. Cl. ............................. 363/37; 363/17; 307/66
(58) Field of Search .............................. 363/37, 17, 39, 363/34, 123, 143, 142; 307/82, 83, 84, 64, 68, 66

(56) References Cited

U.S. PATENT DOCUMENTS

| | | | | |
|---|---|---|---|---|
| 4,827,150 A | * | 5/1989 | Reynal | 307/66 |
| 5,010,469 A | * | 4/1991 | Bobry | 363/37 |
| 5,513,088 A | * | 4/1996 | Williamson | 363/21.18 |
| 5,610,805 A | * | 3/1997 | Gupta | 363/37 |
| 5,635,773 A | * | 6/1997 | Stuart | 307/66 |
| 6,362,979 B1 | * | 3/2002 | Gucyski | 363/17 |

* cited by examiner

*Primary Examiner*—Rajnikant B. Patel
(74) *Attorney, Agent, or Firm*—Troxell Law Office PLLC

(57) ABSTRACT

An off-line non-step voltage regulation uninterruptible power supply. The power supply comprises a plurality of silicon control switches for connecting to a power input end and a battery unit; a plurality of inductances and capacitances for charging; a plurality of transistors for modulating the pulse width; a transformer having a plurality of coil sets separately connected to corresponding input end, output end or signal line by a plurality of switch sets. Therefore, the invention can realize the objective of reducing cost and promoting efficiency.

4 Claims, 3 Drawing Sheets

OFF-LINE NON-STEP VOLTAGE REGULATION UNINTERRUPTIBLE POWER SUPPLY

BACKGROUND OF THE INVENTION

1. Field of the Invention

An off-line non-step voltage regulation uninterruptible power supply, and particularly to an off-line non-step voltage regulation uninterruptible power supply applied in an electricity power system.

2. Description of the Prior Art

An uninterruptible power supply (UPS) is applied for being backup power when power supply is interrupted. Nowadays, UPS is used for minimizing the factors of high and low voltage, surge voltage and noise. Furthermore, some computers, such as File-Servers, are turned on for a long time. When there is no person operating the computers or it is during the nighttime and the electricity quality is unusual, the computers can be turned off by setting the network communication software of the UPS. This avoids the data from be damaged. Therefore, the UPS is not only a power supply system, but also a power protection device. There are two types of power managers, namely UPS. One is on-line uninterruptible power supply, and the other is off-line uninterruptible power supply. By supplying the power directly or through a voltage regulator, the off-line uninterruptible power supply is operated to filter out the noise and absorb the surge so as to be supplied to a load. When power in the input end is within a normal range, the UPS will filter out the noise from the power by and the filtered power is directly output for being supplied as a load. On the contrary, when the power in the input end is unusual, the voltage of the power is increased or reduced by the UPS and the power is outputted after being filtered by the UPS. Finally, when the input power is interrupted, the power is transferred to the battery set and a converter will transform the power into alternating current to be supplied as a load. The conventional on-line uninterruptible power supply requires a greater capacity of the capacitance and has a lower efficiency so as to increase the cost.

The present invention relates to an off-line non-step voltage regulation uninterruptible power supply so as to reduce the cost and improve the efficiency. Compared with the prior art off-line uninterruptible power supply, the efficiency of the power supply according to the invention is increased by 7~10% so as to greatly reduce the cost. Furthermore, compared to the prior art uninterruptible power supply, the inventive power supply can react more quickly.

SUMMARY OF THE INVENTION

The present invention relates to an off-line non-step voltage regulation uninterruptible power supply. The main feature of the invention is that the uninterruptible power supply is connected to a voltage regulator having lower cost and higher efficiency so as to achieve the objective of promoting the efficiency and reducing the cost.

In order to achieve the above objective, the off-line non-step voltage regulation uninterruptible power supply according to the invention comprises a plurality of silicon control switches for connecting to a power input end and a battery unit; a plurality of inductances and capacitances for charging; a plurality of transistors for modulating the pulse width; a transformer having a plurality of coil sets and connected between the input end and output end via a plurality of switch sets.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENT

Figure 1:
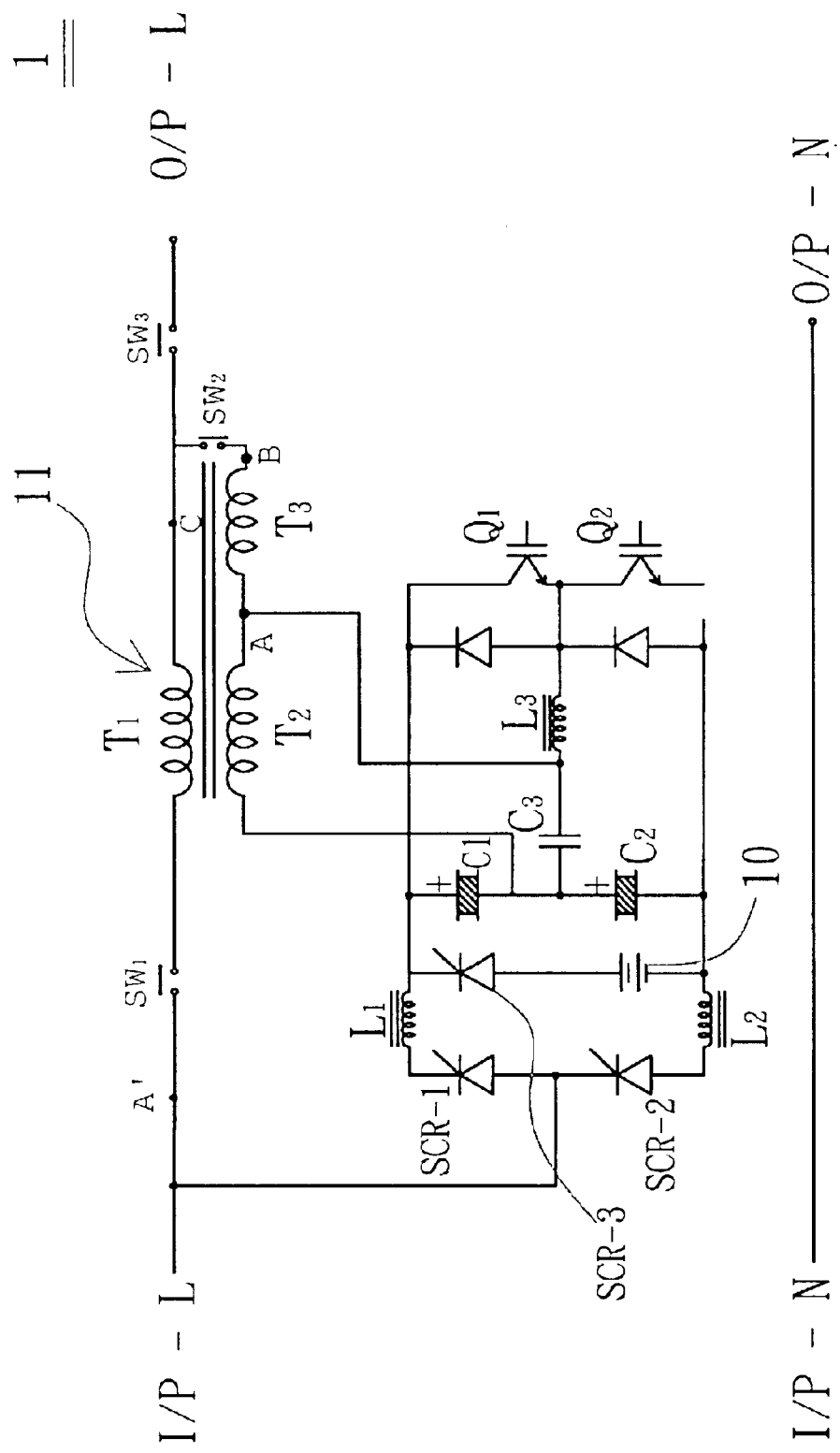
FIG. 1 is a circuit diagram of a first embodiment of an off-line non-step voltage regulation uninterruptible power supply according to the invention.

FIG. 1 is a circuit diagram of a first embodiment of an off-line non-step voltage regulation uninterruptible power supply 1 according to the invention. The power supply comprises a first silicon control switch SCR-1 and a second silicon control switch SCR-2 for connecting to an alternating power input end I/P-L so that the first silicon control switch SCR-1 will be turned on when the power is in the positive half cycle, and a second silicon control switch SCR-2 is turned on when the power is in the negative half cycle; a third silicon control switch SCR-3 is connected to the output of a battery unit 10; a plurality of inductances $L_1$, $L_2$, $L_3$ and capacitances $C_1$, $C_2$, $C_3$ separately connected to the first silicon control switch SCR-1 and the second silicon control switch SCR-2 so that the inputted alternating power is in a state of soft start; tow transistors $Q_1$, $Q_2$ for modulating the pulse width; a transformer 11 having a first coil set $T_1$, a second coil set $T_2$ and a third coil set $T_3$. The input end of the first coil set $T_1$ is connected to the alternating power input end I/P-L by a first switch $SW_1$ and is connected to the output end O/P-L by a third switch $SW_3$. The input and output ends of the second coil set $T_2$ are separately connected to the signal line of the inductance $L_1$-capacitance $C_1$ module and the third coil set $T_3$ is connected between the second coil set $T_2$ and the second switch $SW_2$.

When the alternating power is in the state of normal supplying, the first switch $SW_1$ is turned on, and the first silicon control switch SCR-1 and the second silicon control switch SCR-2 will provide the function of "soft start" by the connected inductance $L_1$, $L_2$-capacitance $C_1$, $C_2$ module. After the transistors $Q_1$, $Q_2$ control the pulse width, it is outputted to the output end O/P-L by oscillating the inductance $L_3$-capacitance $C_3$ module so as to turn on the third switch $SW_3$.

When the power is interrupted, the switch $SW_1$ is turned off, after a short period of interruption (less than 4 ms), the battery unit 10 will supply the power by turning on the third silicon control switch SCR-3. Next, the second switch $SW_2$ is turned on, and the two transistor $Q_1$, $Q_2$ are still acting. At the same time, the point B is turned on, and the point C is turned off, and the third switch $SW_3$ is also turned on so as to keep on supplying and outputting the power. When the battery unit 10 is out of power, the second and third switch $SW_2$, $SW_3$ will be turned off, and then the inverter will be turned off. After the first switch $SW_1$ is turned off, the machine is turned off.

When the power is recovered, it is required to judge whether the voltage at point A' (voltage A') is higher than the voltage at point C (voltage C) so as to determine to increase or decrease the polarity. If voltage A' is greater than voltage C, then the polarity is decreased and is locked synchronically. If voltage A' is less than voltage, then the polarity is increased and is locked synchronically. Next, the second switch $SW_2$ is turned off, and the voltage of the inverter is decreased to $1000V_{AC}$ or suspended. After 4 ms is passed, the first switch $SW_1$, is turned on.

Figure 2:
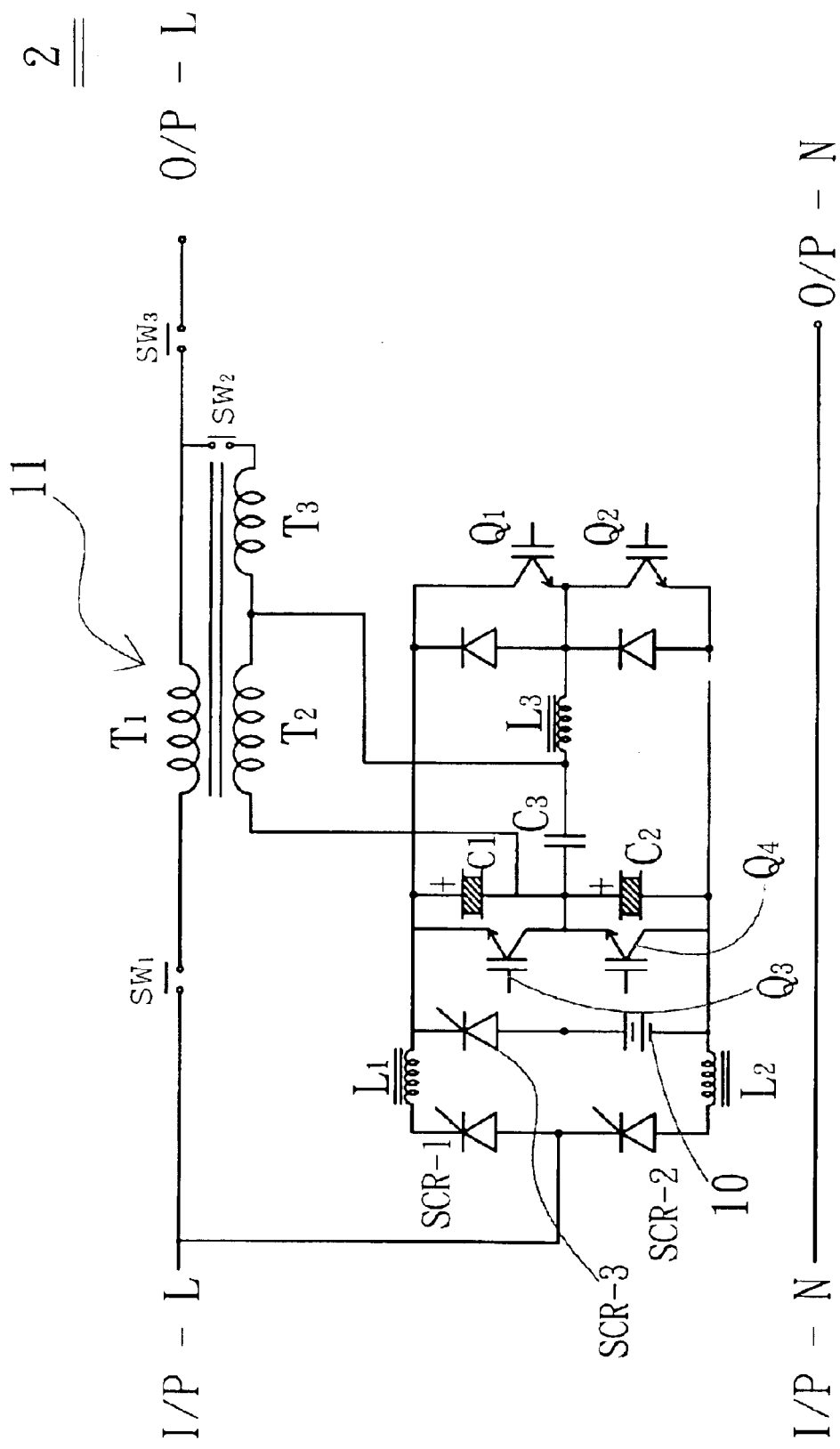
FIG. 2 is a circuit diagram of a second embodiment of an off-line non-step voltage regulation uninterruptible power supply according to the invention.

FIG. 2 is a circuit diagram of a second embodiment of the invention. The circuit in FIG. 2 is almost the same as the circuit in FIG. 1. The only one difference between them is that the circuit in FIG. 2 has a third transistor $Q_3$ and a fourth transistor $Q_4$ for promoting the voltage. The operation principles of the second embodiment are the same as those of the first one, and will not be described in detail.

Figure 3:
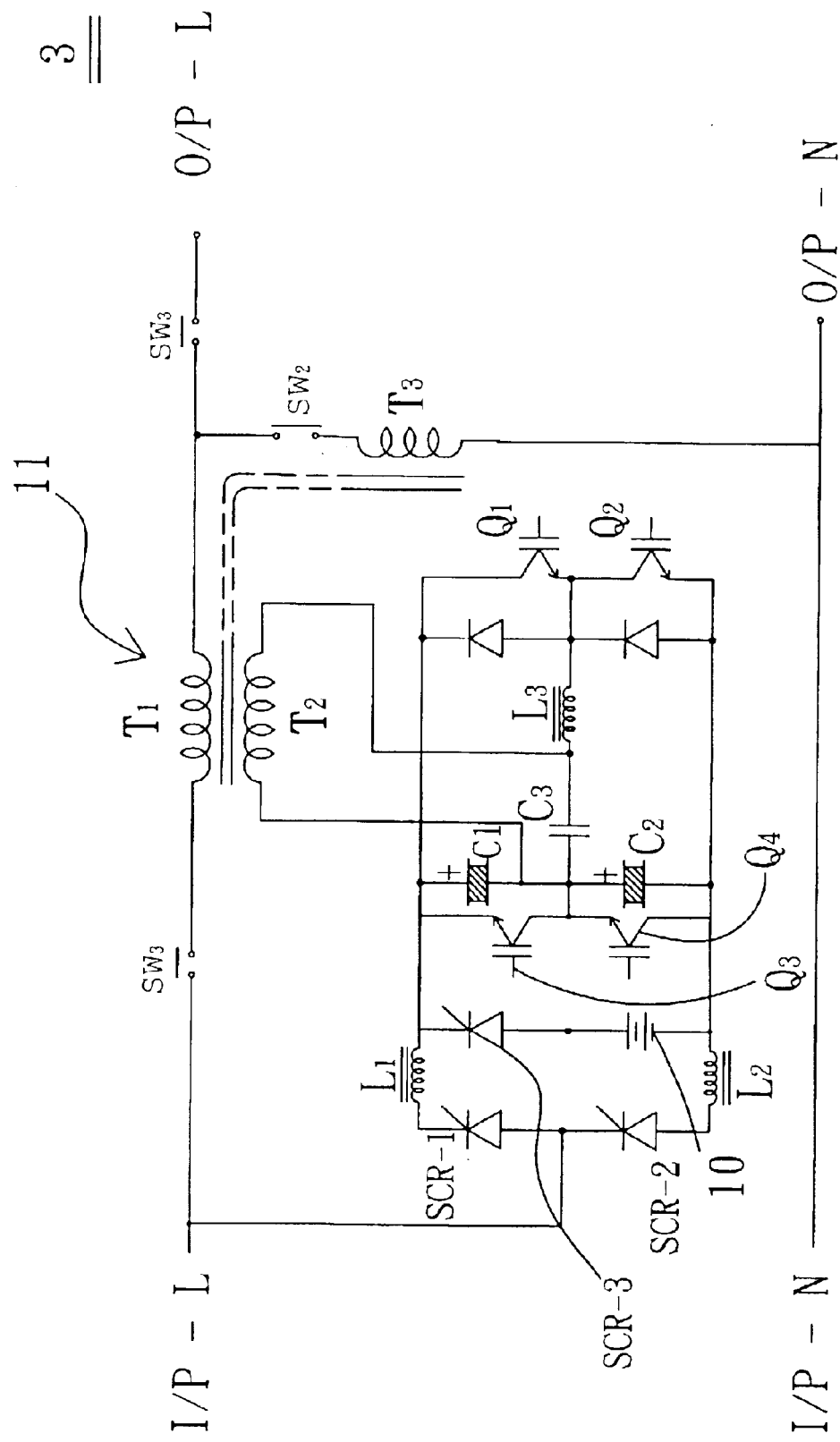
FIG. 3 is a circuit diagram of a third embodiment of an off-line non-step voltage regulation uninterruptible power supply according to the invention.

FIG. 3 is a circuit diagram of a third embodiment of the invention. The circuit in FIG. 3 is almost the same as the circuit in FIG. 2. The difference between them is that in the circuit in FIG. 3, the third coil set $T_3$ is arranged at a different position and is connected between the load end P-L and grounding P-N. The operation principles of the third embodiment are the same as those of the first one, and will not be described in detail.

The above is the detailed description of the off-line non-step voltage regulation uninterruptible power supply according to the invention, and the followings are the advantages of the invention:

1. The cost is reduced and the circuit is simplified.

2. The structure is simple so as to extend the usage life of the power supply.

3. The efficiency is promoted by at least 7~10% so as to save the power source.

4. The characteristics of the circuit are good; the distortion of waveform is small; the harmonic wave is low; the static voltage regulation rate is better (±1%); the dynamic voltage dropping is within the range of ±6% and the power supply can be accurately adjusted in a non-step manner, and there is no mechanic components, all of the components are electrical; the reacting time of the power supply is short and the power supply is returned to be stable in 20 ms.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An off-line non-step voltage regulation uninterruptible power supply comprising:

a first silicon control switch and a second silicon control switch for connecting to an alternating power input end so that a first silicon control switch being turned on when the power being in a positive half cycle, and a second silicon control switch being turned on when the power being in a negative half cycle;

a third silicon control switch connected to an output of a battery unit;

a plurality of inductances and capacitances connected to a first silicon control switch and a second silicon control switch so that the inputted alternating power being in the state of soft start;

a plurality of transistor for modulating the pulse width; and a transformer comprising a first coil set, a second coil set and a third coil set, wherein the input end of the first coil set is connected to the alternating power input end by a first switch, and is connected to the output end by a third switch, and the input and output ends of the second coil set are separately connected to a signal line of a inductance-capacitance module, and the third coil set is connected between the second coil set and the third switch.

2. The off-line non-step voltage regulation uninterruptible power supply of claim 1, wherein the transistor comprises a first transistor and a second transistor connected to the inductance-capacitance module.

3. The off-line non-step voltage regulation uninterruptible power supply of claim 2 further comprising a third transistor and a fourth transistor connected to the inductances.

4. An off-line non-step voltage regulation uninterruptible power supply comprising:

a first silicon control switch and a second silicon control switch for connecting to an alternating power input end so that a first silicon control switch being turned on when the power being in a positive half cycle, and a second silicon control switch being turned on when the power being in a negative half cycle;

a third silicon control switch connected to an output of a battery unit;

a plurality of inductances and capacitances connected to a first silicon control switch and a second silicon control switch so that the inputted alternating power being in the state of soft start;

a plurality of transistor for modulating the pulse width; and a transformer comprising a first coil set, a second coil set and a third coil set, wherein the input end of the first coil set is connected to the alternating power input end by a first switch, and is connected to the output end by a third switch, and the input and output ends of the second coil set are separately connected to a signal line of a inductance-capacitance module, and the third transistor is connected between a load end and a grounding end.

* * * * *